Nov. 19, 1940.  J. DENNIS, JR  2,222,222
FOLDABLE BED
Filed March 15, 1939  3 Sheets—Sheet 1
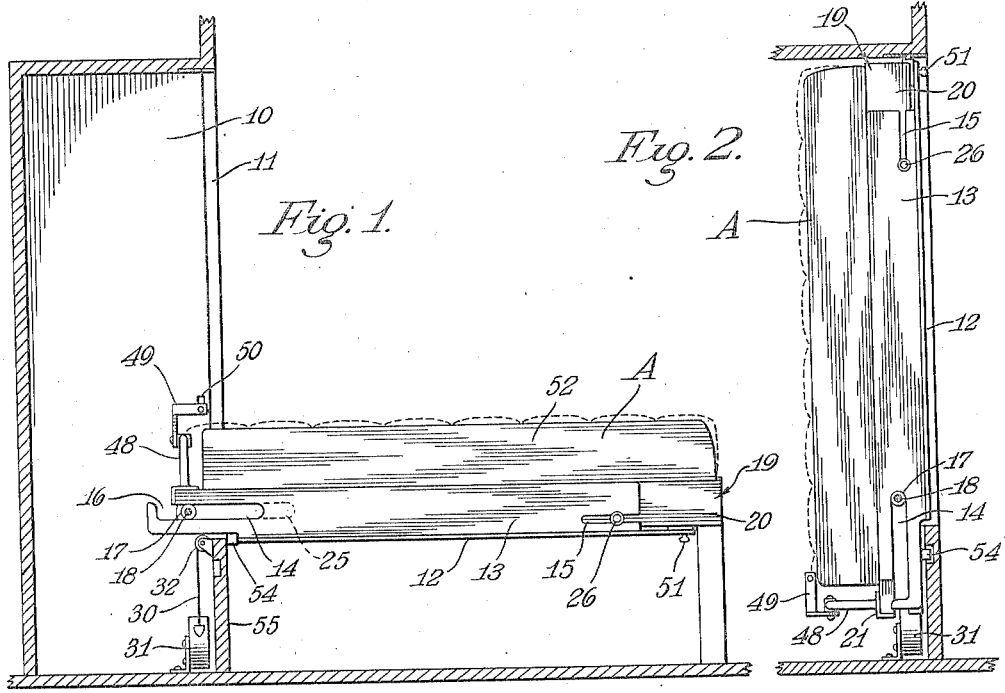
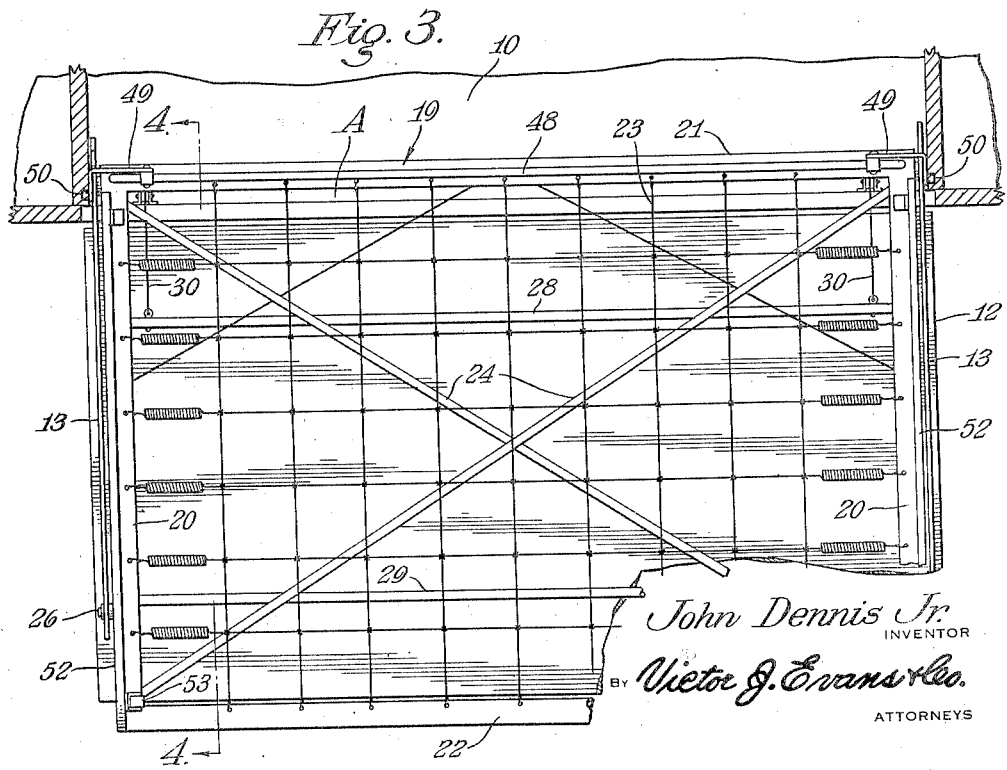
John Dennis Jr.
INVENTOR
BY Victor J. Evans & Co.
ATTORNEYS

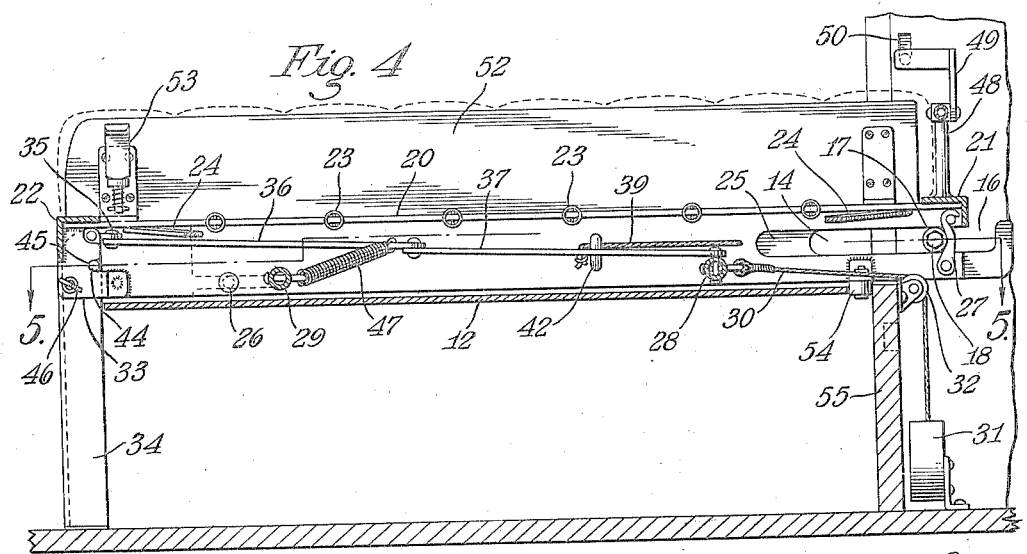
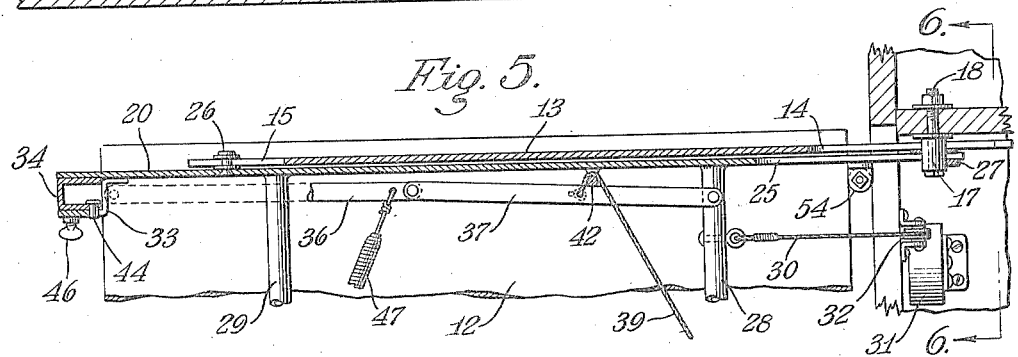
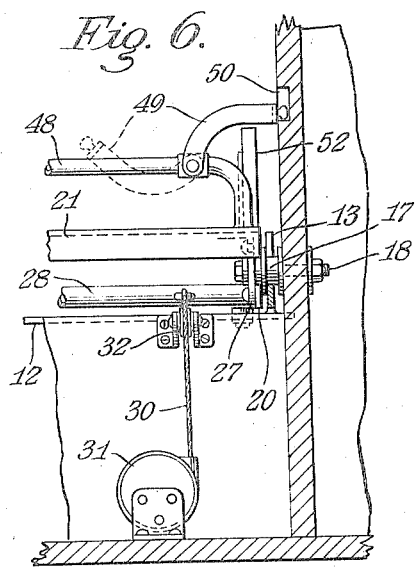
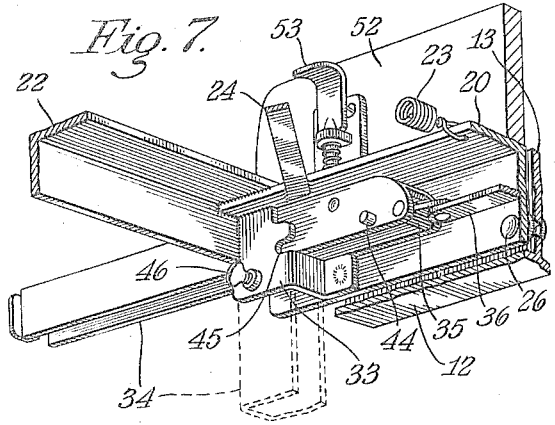

Nov. 19, 1940. J. DENNIS, JR 2,222,222
FOLDABLE BED
Filed March 15, 1939 3 Sheets-Sheet 3
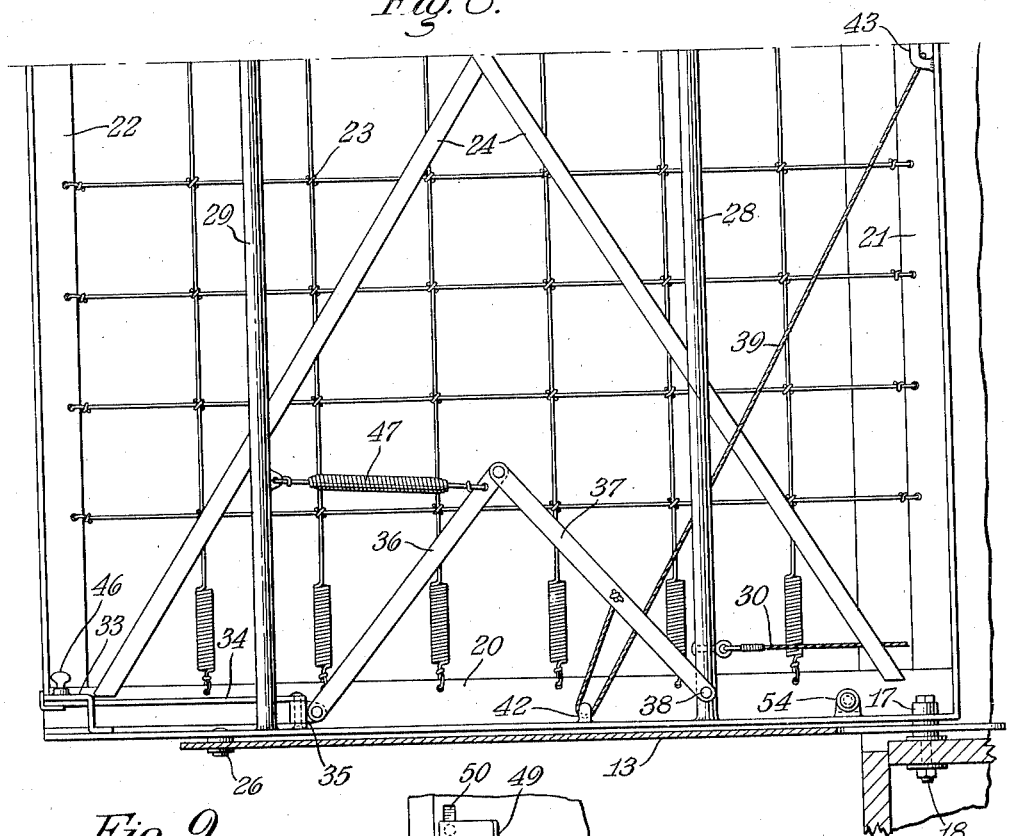
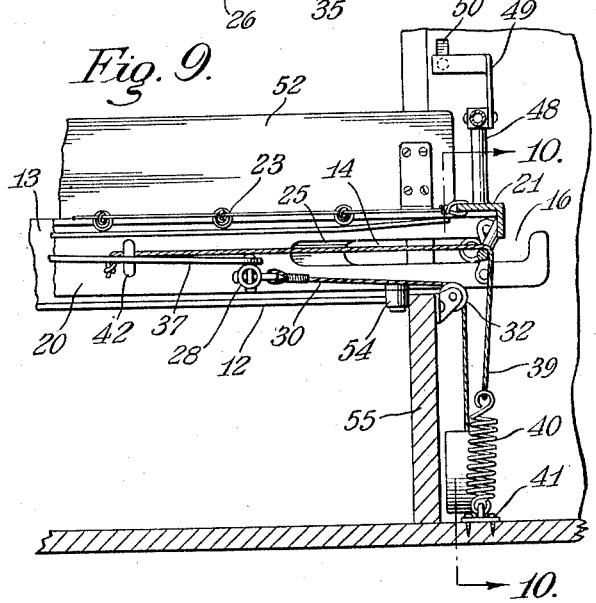
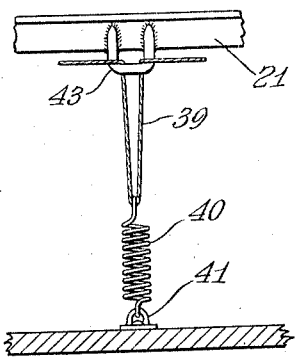
John Dennis Jr.
INVENTOR
BY Victor J. Evans & Co.
ATTORNEYS Patented Nov. 19, 1940

2,222,222

UNITED STATES PATENT OFFICE 2,222,222

FOLDABLE BED

John Dennis, Jr., Birmingham, Ala.

Application March 15, 1939, Serial No. 262,037

5 Claims. (Cl. 5—143)

The invention relates to a foldable bed and more especially to a disappearing or wall bed.

The primary object of the invention is the provision of a bed of this character, wherein its construction permits of the folding thereof in a unique manner so as to be concealed from view when not in use and is susceptible of being stored in a wall recess closed by a frontal piece or panel, the bed being readily extended or unfolded for use.

Another object of the invention is the provision of a bed of this character, wherein the construction thereof is such that when the bed is extended for use there is no liability of accidental folding thereof, being safe for occupancy and when not in use will disappear from view.

A further object of the invention is the provision of a bed of this character, wherein the build thereof permits of the folding of the same into compact form and when in a folded condition allows for maximum room space in that no part of the room is occupied by the bed except when the same is unfolded or extended for use.

A still further object of the invention is the provision of a bed of this character, which is simple in its construction, thoroughly reliable and effective in operation, novel in construction, convenient for sleeping purposes, readily and easily handled, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a side elevation of the bed, constructed in accordance with the invention shown, in lowered and extended position ready for use, a portion of the space or recess in which the bed is foldable being shown.

Figure 2 is a view similar to Figure 1 showing the bed folded in its space or recess.

Figure 3 is a fragmentary top plan view with the bed lowered and in extended position.

Figure 4 is a sectional view taken on the line 4—4 of Figure 3 looking in the direction of the arrows.

Figure 5 is a sectional view taken on the line 5—5 of Figure 4 looking in the direction of the arrows.

Figure 6 is a fragmentary sectional view taken on the line 6—6 of Figure 5 looking in the direction of the arrows.

Figure 7 is a fragmentary perspective view showing one of the legs for the bed being partly extended by full lines and by dotted lines in a supporting position when the bed is lowered and extended.

Figure 8 is a fragmentary bottom plan view partly in section with the bed lowered and illustrates one of the legs, with the latter retracted, together with the position assumed by the toggle means and associated elements effecting the operation of the legs, when they are retracted.

Figure 9 is a fragmentary vertical sectional view through the bed when in a lowered extended position.

Figure 10 is a sectional view taken on the line 10—10 of Figure 9 looking in the direction of the arrows.

Similar reference characters indicate corresponding parts throughout the several views in the drawings.

Referring to the drawings in detail, A designates the foldable bed, which, when in a folded condition, is adapted to be accommodated in a space or recess of some character, for example, at 10, being formed in a side wall of an enclosure and is partially open at 11 so that the bed A when unfolded or lowered and extended for use can be projected into the enclosure for such purpose. The opening 10 is closed by a panel, or what might be termed a door, 12 provided at opposite side edges thereof with flanges 13 which extend parallel with each other and at substantially right angles from the innermost face of said door. These flanges at opposite ends thereof are provided with slots 14 and 15, respectively. Each slot 14 at the outermost end thereof opens at right angles thereto, as at 16, through the free edge of the flange 13 having the same, while each slot 15 opens straight through the free end edge of said flange. The slots 14 accommodate rollers 17 journaled upon fixed stud axles or arbors 18, these being secured in the opposite sides of the recess or space to project inwardly thereof in axial alignment in a horizontal plane so that the panel or door 12 is susceptible of vertical swing and has limited displacement so that it can be brought into register with the opening 11 to fit therein, the flanges 13 being extended at the ends having the slots 14 beyond the said panel or door for displacement thereof supplementary to the vertical swing of the same.

Carried by the panel or door 12 is a bed spring frame 19 including opposite side rails 20 and opposite end rails 21 and 22, respectively, these being integral with each other for rigidity to the said frame 19. The bed springs are denoted at 23 and are supported by the frame 19 in the usual well-known manner, which frame is also strengthened by diagonally disposed cross braces 24, as is usual. Each side rail 20 is provided with a slot 25 companion to the slot 14 next thereto and opens through the said rail 20. The slot 25 accommodates the roller 17 which is accommodated in the slot 14, while spaced from this slot 25 and on each of the rails 20 is a coupling lug 26, received in the slot 15 next thereto, and being permanently fixed in the rail 20 of the frame 19. In this manner the frame 19 is slidably fitted on the door or panel 12 at the innermost side thereof between the flanges 13 thereon. Each slot 25 is closed at its open end by a releasable latch 27 so as to prevent the accidental release of the roller 17 from the slot 25. However, when it is desired to detach the panel or door 12 from the rollers 17 and also to have the frame 19 removed therewith, the latches 27 are released from closing position with respect to the slots 25 and the rollers 17 having passage through the openings 16 of the slots 14.

The frame 19 is built with spaced parallel cross bars 28 and 29 and to the bar 28 is attached the extensible and contractable cable 30 of a takeup device 31, being a spring winding type, and fixed within the space or recess 10 below the axis of swing of the panel or door 12 and said cable 30 is trained over a guide pulley 32 adjacent to the lowermost portion of the opening 11, as shown in Figure 4 of the drawings.

It is of course understood that a pair of takeup devices 31 are employed and their location is shown in Figure 6 of the drawings.

Mounted on each of the side rails 20 next to the end rail 22 of the frame 19 is a guide bracket 33 in which is slidable and turnable a supporting leg 34, which is pivotally linked at 35 to an arm 36 of a double-armed toggle, the other arm 37 being pivoted at 38 to the bar 28 and this arm has connected to it a cable 39, which is connected with a coiled tensioning or retractile spring 40 anchored at 41 within the space or recess of the bottom thereof. This cable 39 is threaded through guide eyes 42 and 43, respectively, these being on the frame 19. It is of course understood that there is employed a pair of double-armed toggles, these being arranged at opposite sides of the frame 19 interiorly thereof and a single cable 39 has connection with such toggles, as before indicated, for the tensioning thereof in unison with each other.

The operation of the toggles when the bed is lowered and extended effects the projecting of the legs 34 so that they can be swung to supporting position. In this position each leg 34 has a pivot lug 44 engaging in a fulcrum seat 45 in the bracket 33. The leg 34 is fastened in the supporting position by a set screw 46 fitted in the bracket 33. The screw 46 is conveniently accessible for manual operation. The spring 40 is of a strength to extend the toggles when the bed is lowered and in this manner project the legs 34. The supporting position of the legs 34 is shown in Figures 1 and 4 of the drawings.

The arm 36 of each toggle has connected thereto a coiled spring 47, which is connected with the bar 29, and the purpose of this spring is to operate the toggle when the bed is to be folded within the space or recess 10 and the legs 34 have been released by the set screws 46 and turned to a position for sliding through the brackets 33, as is shown by full lines in Figure 7 of the drawings. This spring 47 becomes active by the lessening of the tension on the cable 39 resultant from the vertical swinging of the bed to disappearing position within the recess or space 10 and thus the said legs will be retracted in the and frame 19 and also this frame will lower with relation to the panel or door 12 when the latter is in perpendicular position closing the open front 11 and the bed has disappeared within the space or recess 10. However, when the bed has been lowered and extended, it is preferable that the same be latched in this position by latches mounted on a crown rail 48 upon the frame 19. Next to opposite ends of said rail are the swingably supported releasable latches 49, these being engageable in keeper notches 50 provided in the opposite sides of the space or recess 10 and in this fashion the accidental folding of the bed will be prevented with the result that safety is assured during occupancy thereof.

The bed in its entirety swings sidewise although it can be mounted to swing endwise in the folding and unfolding thereof without necessitating any changes or alterations in the construction hereinbefore set forth.

The panel or door 12 is equipped with a suitable latch adapted for hand control, as at 51, for the latching of such panel or door in its closed position.

The frame 19 is equipped with side pieces 52 and also equipped with mattress holds, one being indicated at 53, for a mattress superimposed upon the springs 23 of the frame 19.

The frame 19 is slidably supported by the panel or door 12 so that it can be lowered into the space or recess 10 on the vertical swinging of the panel or door to closing position and in this way eliminating the necessity for increasing the size of the opening 11 for effecting a clearance sufficient for the proper operation of the bed in the folding thereof and the disappearance of the same as before stated.

The latches 49 are released from the keeper notches 50 for the folding of the bed and when such bed is lowered and extended, these latches 49 engage in the keepers 50, locking the bed in such lowered extended position.

The frame 19 has on each side rail 20 thereof a stop 54 which limits sliding movement inwardly with respect to the panel or door 12 when the bed is lowered or unfolded and this stop makes contact with the wall 55 when the bed is in unfolded condition. This stop 54 also has engagement with the edge next thereto of said panel or door 12 as will appear in Figures 4, 5 and 9 of the drawings.

The cables 30 of the devices 31 are trained over the pulleys 32, which are located a determined distance below the axis on which the bed swings, the axis being established by the arbors 18 having the rollers 17 journaled thereon so that the said devices 31 do not actually operate for balancing purposes but merely assist in pulling the frame 19 inwardly on the upward swing of the panel or door 12. The tension of these devices 31 is dissipated when the panel or door 12 has been swung downwardly to a substantially horizontal position so as to relieve the frame 19 from any excessive resisting effect from the said devices 31. As the panel or door 12 moves to a horizontal position, the frame 19 is manually pulled upon. This manual operation is augmented by the influence of the spring 40 which functions to move the legs 34 so that the same can be turned to a supporting position when the frame 19 has been pulled out far enough that the said legs clear the panel or door 12. The panel or door 12 is latched when reaching a substantially horizontal position by the latches 49 hereinbefore described.

The devices 31 are not of a powerful type and are merely for the purpose of assisting the inward movement of the frame 19 when the panel or door 12 is swung upwardly and the legs 34 have been released from supporting position. The spring 47 is only of a sufficient tension to effect the initial breaking of the toggles 37 as when the panel or door 12 reaches an elevation above the horizontal plane these legs through gravity will slide inwardly of the frame 19. The panel or door 12 with the frame 19 thereon settles to a position as shown in Figure 2 of the drawings when the bed in its entirety has been raised completely. The panel or door 12 is guided in such movement by the arbors 17 having journaled thereon the rollers 18 through engagement of these in the slots 14 and 25. The slots 14 are in the flanges 13 while the slots 25 are in the side rails 20, these slots being in matched relation to each other.

What is claimed is:

1. A folding bed for an enclosure having a door opening comprising a panel for said opening having opposite side flanges parallel with each other at the innermost face, a mattress springs slidably connected with said flanges, supporting legs movably fitted to the said springs and swingable to supporting and non-supporting positions on the sliding of the springs, means for latching the legs in supporting position, means for latching the springs against inward sliding movement relative to the panel and the door opening when said panel is horizontal, toggles operating with the said legs and controlled through movement of the springs for the shifting of the legs to supporting and non-supporting positions, a crown rail on the said springs, and latches swingably fitted to the crown rail and engageable with fixed portions of the enclosure for holding the panel and mattress springs when in a horizontally disposed position against folding movement.

2. A folding bed for an enclosure having a door opening comprising a panel for said opening having opposite side flanges parallel with each other at the innermost face, a mattress springs slidably connected with said flanges, supporting legs movably fitted to the said springs and swingable to supporting and non-supporting positions on the sliding of the springs, means for latching the legs in supporting position, means for latching the springs against inward sliding movement relative to the panel and the door opening when said panel is horizontal, toggles operating with the said legs and controlled through movement of the springs for the shifting of the legs to supporting and non-supporting positions, a crown rail on the said springs, latches swingably fitted to the crown rail and engageable with fixed portions of the enclosure for holding the panel and mattress springs when in a horizontally disposed position against folding movement, and stops on the said mattress springs for coaction with the edge of the panel when the springs are in a horizontal position to limit movement of the latter in another direction.

3. A folding bed for an enclosure having a door opening comprising a panel for said opening having opposite side flanges parallel with each other at the innermost face, a mattress springs slidably connected with said flanges, supporting legs movably fitted to the said springs and swingable to supporting and non-supporting positions on the sliding of the springs, means for latching the legs in supporting position, means for latching the springs against inward sliding movement relative to the panel and the door opening when said panel is horizontal, toggles operating with the said legs and controlled through movement of the springs for the shifting of the legs to supporting and non-supporting positions, a crown rail on the said springs, latches swingably fitted to the crown rail and engageable with fixed portions of the enclosure for holding the panel and mattress springs when in a horizontally disposed position against folding movement, stops on the said mattress springs for coaction with the edge of the panel when the springs are in a horizontal position to limit movement of the latter in another direction, and means loosely connecting the said legs with the toggles for the swinging thereof in the plane of the springs and at right angles to the panel.

4. A folding bed for an enclosure having a door opening comprising a panel for said opening having opposite side flanges parallel with each other at the innermost face, a mattress springs slidably connected with said flanges, supporting legs movably fitted to the said springs and swingable to supporting and non-supporting positions on the sliding of the springs, means for latching the legs in supporting position, means for latching the springs against inward sliding movement relative to the panel and the door opening when said panel is horizontal, toggles operating with the said legs and controlled through movement of the springs for the shifting of the legs to supporting and non-supporting positions, a crown rail on the said springs, latches swingably fitted to the crown rail and engageable with fixed portions of the enclosure for holding the panel and mattress springs when in a horizontally disposed position against folding movement, stops on the said mattress springs for coaction with the edge of the panel when the springs are in a horizontal position to limit movement of the latter in another direction, means loosely connecting the said legs with the toggles for the swinging thereof in the plane of the springs and at right angles to the panel, brackets on the springs having fulcrum seats, pivot lugs on the legs for engaging the fulcrum seats on the swinging of said legs, the flanges being slotted at opposite ends thereof, one slot at one end of each flange being provided with a substantially right angular portion thereto opening through the flange, and stud axles fixed within the enclosure at the opening thereof for accommodation in the last-mentioned slots and regulating displacement of the springs and panel with respect to the opening and also the vertical swing of said spring and panel.

5. A folding bed for an enclosure having a door opening comprising a panel for said opening having opposite side flanges parallel with each other at the innermost face, a mattress springs slidably connected with said flanges, supporting legs movably fitted to the said springs and swingable to supporting and non-supporting positions on the sliding of the springs, means for latching the legs in supporting position, means for latching the springs against inward sliding movement relative to the panel and the door opening when said panel is horizontal, toggles operating with the said legs and controlled through movement of the springs for the shifting of the legs to supporting and non-supporting positions, a crown rail on the said springs, latches swingably fitted to the crown rail and engageable with fixed portions of the enclosure for holding the panel and mattress springs when in a horizontally disposed position against folding movement, stops on the said mattress springs for coaction with the edge of the panel when the springs are in a horizontal position to limit movement of the latter in another direction, means loosely connecting the said legs with the toggles for the swinging thereof in the plane of the springs and at right angles to the panel, brackets on the springs having fulcrum seats, pivot lugs on the legs for engaging the fulcrum seats on the swinging of said legs, the flanges being slotted at opposite ends thereof, one slot at one end of each flange being provided with a substantially right angular portion thereto opening through the flange, stud axles fixed within the enclosure at the opening thereof for accommodation in the last-mentioned slots and regulating displacement of the springs and panel with respect to the opening and also the vertical swing of said spring and panel, and take-up devices coacting with the springs.

JOHN DENNIS, Jr.